United States Patent [19]

Hayashi et al.

[11] Patent Number: 5,306,540
[45] Date of Patent: Apr. 26, 1994

[54] TRIM STRUCTURE

[75] Inventors: Yoshihisa Hayashi; Hiroshi Kano, both of Tarui, Japan

[73] Assignee: Ikeda Bussan Co., Ltd., Ayase, Japan

[21] Appl. No.: 8,345

[22] Filed: Jan. 22, 1993

[30] Foreign Application Priority Data

Jan. 29, 1992 [JP] Japan .................... 4-008931[U]

[51] Int. Cl.⁵ .................................. B32B 3/00
[52] U.S. Cl. .................................. 428/172; 428/156; 428/161; 428/163; 428/167; 428/192
[58] Field of Search ............... 428/156, 172, 119, 120, 428/187, 192, 68, 76, 31, 137, 182, 161, 163, 167

[56] References Cited

U.S. PATENT DOCUMENTS 4,636,421 1/1987 Hotovy ............................ 428/156

Primary Examiner—Donald J. Loney
Attorney, Agent, or Firm—Foley & Lardner

[57] ABSTRACT

A vehicular door trim structure includes a base member and an inner trim member which has a pad member and an outer skin member. An interlayer member is inserted between the base member and the pad member. A major surface of the interlayer has a smaller area than areas of the base member, the pad member and the outer skin member. A concavely shaped pattern is formed on the inner trim member so as to be positioned in the vicinity of an edge portion of the interlayer member. With this, the external appearance of the trim structure is enhanced.

10 Claims, 2 Drawing Sheets

TRIM STRUCTURE

BACKGROUND OF THE INVENTION

1. Field of the Invention

The present invention relates in general to a trim structure, and more particularly to a trim structure used for an interior lining, for example, of a door member of a motor vehicle.

2. Description of the Prior Art

In order to clarify the task of the present invention, one conventional vehicular trim structure as an interior lining will be outlined with reference to FIG. 5.

As is seen from FIG. 5, the trim structure 10 comprises a base member 12 such as a hardboard and an inner trim member 14 which is exposed and stuck on the base member 12 by a suitable adhesive. The inner trim member 14 comprises a pad member 16 of foamed plastic such as soft foamed polyurethane, foamed polyethylene or foamed polypropylene, and an outer skin member 18 of a thermoplastic resin sheet such as a polyvinyl chloride sheet. The base member 12 is bent such that there are provided a plurality of depressions 20. The trim structure 10 is fixed to a door panel (not shown) through a plurality of fixing pins 22. Each pin comprises a base flat portion 22a and a spearhead-shaped portion 22b. Each pin 22 is fixed to the base member 12 of the trim structure 10 in such a manner that the base flat portion 22a of the fixing pin 22 is received in the depression 20 and that the spearhead-shaped portion 22b of the fixing pin 22 projects from the outer side of the base member 12 of the trim structure 10. The trim structure 10 is brought into engagement with the door panel so as to thrust each spearhead-shaped portion 22b of the fixing pin 22 into an opening (not shown) of the door panel. There is provided an interlayer member 24 such as a sheet of cardboard, metal foil, adhesive tape or the like. With this, the exposed inner surface of the inner trim member 14 is prevented from having depressions at positions corresponding to the positions of the depressions 20 of the base member 12. If there were no interlayer member 24 between the base member 12 and the inner trim member 14, the inner trim member 14 would be depressed into the depressions 20 of the base member 12. However, the conventional trim structure 10 has the following drawback.

Due to the provision of the interlayer member 24 between the base member 12 and the inner trim member 14, there is inevitably produced a stepped portion 26 on the inner trim member 14. In other words, a portion of the inner trim member 14 slightly protrudes from the remaining portion of the inner trim member 14 due to the provision of the interlayer member 24. Therefore, the stepped portion 26 is produced, and it damages the external appearance of the trim structure 10.

SUMMARY OF THE INVENTION

It is therefore an object of the present invention to provide a trim structure which has an improved external appearance as compared with the conventional trim structure.

According to the present invention, there is provided a trim structure comprising: a base member; an inner trim member placed on said base member, said inner trim member having a pad member and an outer skin member covering said pad member, said pad member having a first portion directly stuck on said base member and a second portion; and an interlayer member positioned between said base member and the second portion of said pad member, said inner trim member having a concavely shaped pattern formed thereon, said pattern being positioned in the vicinity of an edge portion of said interlayer member.

Due to the provision of the pattern, the stepped portion on the inner trim member of the conventional trim structure is not produced or becomes at least unobtrusive in the present invention.

DETAILED DESCRIPTION OF THE INVENTION

According to the present invention, there is provided a trim structure which is used as an interior lining of a door member of a motor vehicle.

Parts and constructions substantially the same as those of the above-mentioned conventional trim structure are denoted by the same numerals and a detailed explanation of them will be omitted from the following description.

Figure 1:
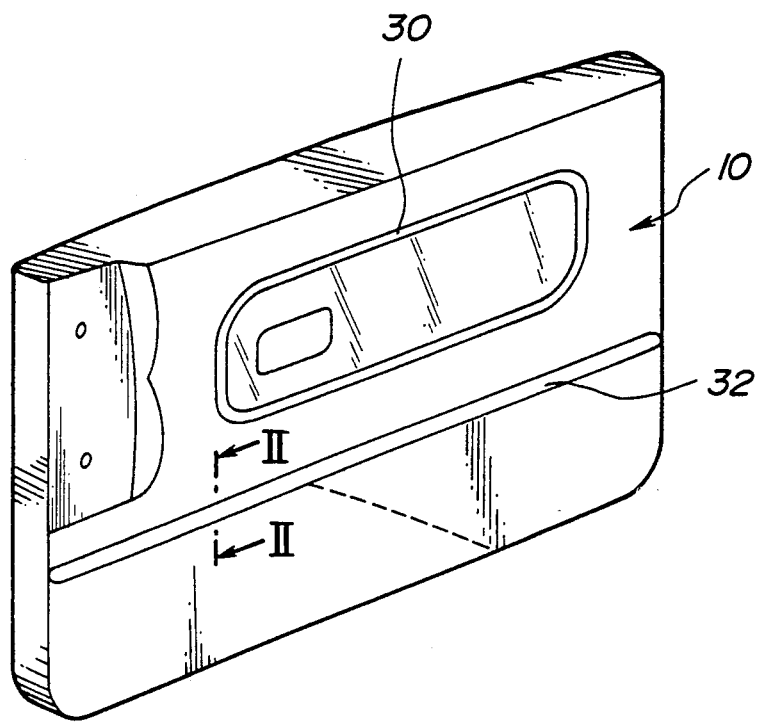
FIG. 1 is a perspective view of a vehicular door trim structure according to the present invention.

In the present invention, as is seen from FIG. 1, there are provided a concavely shaped loop pattern 30 and a concavely shaped linear pattern 32 on an inner trim member 14 for the purpose of decoration of the door trim structure 10.

Figure 2:
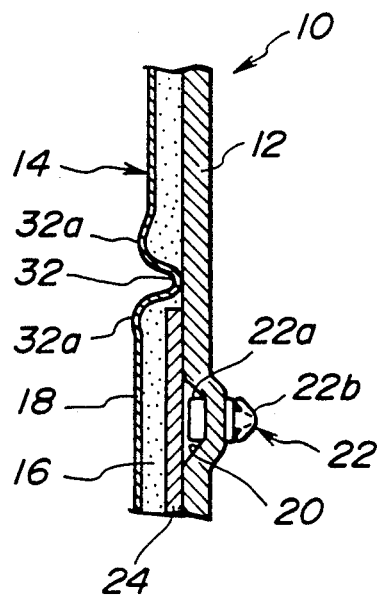
FIG. 2 is a sectional view which is taken along the line II—II of FIG. 1, showing a concavely shaped linear pattern positioned immediately above an edge portion of an interlayer member of the trim structure.
Figure 3:
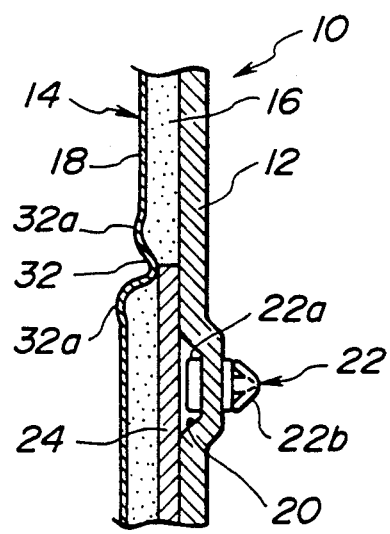
FIG. 3 is a view similar to FIG. 2, but showing a concavely shaped linear pattern positioned on the edge portion of the interlayer member.
Figure 4:
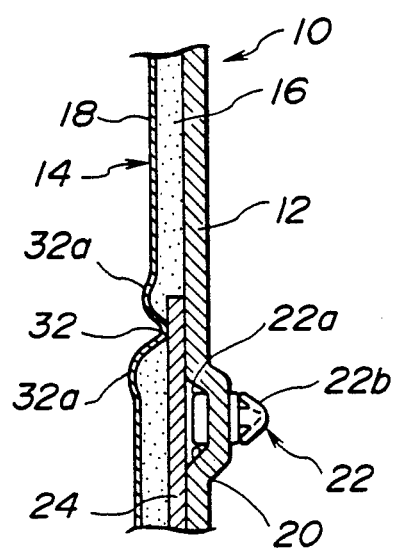
FIG. 4 is a view similar to FIG. 2, but showing a concavely shaped linear pattern positioned immediately below the edge portion of the interlayer member.
Figure 5:
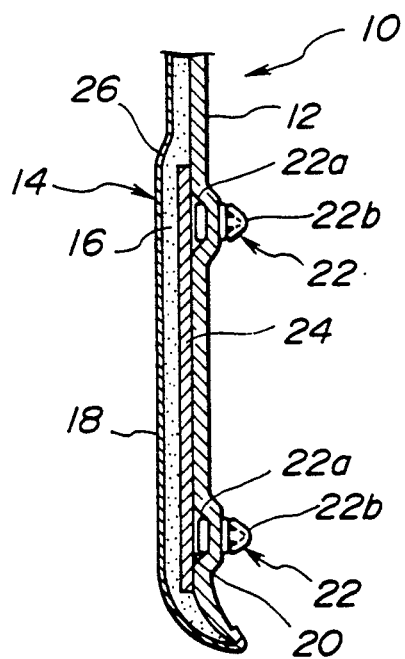
FIG. 5 is a view similar to FIG. 5, but showing a conventional trim structure.

As is seen from FIGS. 2, 3 and 4, the concavely shaped linear pattern 32 is positioned in the vicinity of the edge portion of an interlayer member 24. By the provision of the linear pattern 32, there are produced two projected portions 32a on both sides of the linear pattern 32.

It should be noted that the positioning of the linear pattern 32 relative to the position of the edge portion of the interlayer member 24 is strictly controlled according to the present invention. In the present invention, the linear pattern 32 can take the following first, second and third positions relative to the position of the edge portion of the interlayer member 24. That is, as is seen from FIG. 2, as the first position, the linear pattern 32 is positioned immediately above the edge portion of the interlayer member in FIG. 2. As the second position, as is seen from FIG. 3, the linear pattern 32 is positioned on the edge portion of the interlayer member 24. As the third position, as is seen from FIG. 4, the linear pattern 32 is positioned immediately below the edge portion of the interlayer member 24.

Due to the provision of the concavely shaped linear pattern 32 in the vicinity of the edge portion of the interlayer member 24, the above-mentioned stepped portion 26 of the conventional trim structure is not produced or becomes at least unobtrusive. Therefore, the external appearance of the trim structure is substantially enhanced.

The loop and linear patterns 30 and 32 are formed, for example, by high frequency welding process, a so-called heated knife process or the like, after sticking the heated inner trim member 14 on the base member 12 with using a press machine. However, it is optional to form the loop and linear patterns 30 and 32 by a convex portion formed on a mold of the press machine when the inner trim member 14 and the base member 12 are pressed.

What is claimed is:

1. A trim structure comprising:
    a base member having a first side and a second side, and including at least one depression in said first side;
    an inner trim member placed on said first side of said base member, said inner trim member comprising a pad member having a first side facing said first side of said base member and an outer skin member covering a second side of said pad member facing away from said base member, said pad member having a first portion directly adhered to said base member and a second portion not directly adhered to said base member; and
    an interlayer member positioned between said base member and the second portion of said pad member in order to cover said depression, said interlayer member having an edge portion, said inner trim member having a concavely shaped pattern formed thereon, said pattern being positioned in the vicinity of said edge portion of said interlayer member.

2. A trim structure according to claim 1, wherein said pattern is positioned immediately above the edge portion of said interlayer member.

3. A trim structure according to claim 1, wherein said pattern is positioned immediately on the edge portion of said interlayer member.

4. A trim structure according to claim 1, wherein said pattern is positioned immediately below the edge portion of said interlayer member.

5. A trim structure according to claim 1, wherein said pattern is formed by high frequency welding.

6. A trim structure according to claim 1, wherein said base member is a hardboard.

7. A trim structure according to claim 1, wherein said pad member is a foamed plastic.

8. A trim structure according to claim 1, wherein said outer skin member is a thermoplastic resin sheet.

9. A trim structure according to claim 1, wherein said interlayer member is selected from the group consisting of a sheet of cardboard, a sheet of metal foil and a sheet of adhesive tape.

10. A trim structure according to claim 1, wherein a major surface of said interlayer member has a smaller area than areas of major surfaces of said base member, said pad member and said outer skin member.

* * * * *